US007963588B2

United States Patent
Kanagai et al.

(10) Patent No.: US 7,963,588 B2
(45) Date of Patent: Jun. 21, 2011

(54) VEHICLE BODY LOWER STRUCTURE

(75) Inventors: Shunsuke Kanagai, Anjo (JP); Akihiro Sarada, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 189 days.

(21) Appl. No.: 12/302,573

(22) PCT Filed: May 11, 2007

(86) PCT No.: PCT/JP2007/059756
§ 371 (c)(1),
(2), (4) Date: Nov. 26, 2008

(87) PCT Pub. No.: WO2007/138839
PCT Pub. Date: Dec. 6, 2007

(65) Prior Publication Data
US 2009/0146457 A1    Jun. 11, 2009

(30) Foreign Application Priority Data

May 29, 2006  (JP) ................................. 2006-148625

(51) Int. Cl.
*B62D 21/15* (2006.01)
(52) U.S. Cl. ............... 296/187.12; 296/209; 296/203.03
(58) Field of Classification Search .................. 296/209, 296/187.01, 187.03, 187.12, 203.01, 204, 296/205, 203.03, 29, 30
See application file for complete search history.

(56) References Cited

U.S. PATENT DOCUMENTS

| | | | | |
|---|---|---|---|---|
| 4,582,357 A * | 4/1986 | Nakamura et al. | ....... | 296/203.03 |
| 5,171,058 A | 12/1992 | Ishikawa | | |
| 5,924,765 A * | 7/1999 | Lee | ............... | 296/209 |
| 6,053,564 A * | 4/2000 | Kamata et al. | ........... | 296/187.09 |
| 6,409,257 B1 * | 6/2002 | Takashina et al. | ............ | 296/209 |
| 6,834,912 B2 * | 12/2004 | Cardimen et al. | ............ | 296/204 |
| 2002/0008409 A1 * | 1/2002 | Heise et al. | ................... | 296/204 |

FOREIGN PATENT DOCUMENTS
JP        3-71981        7/1991
JP        2006-21744     1/2006

OTHER PUBLICATIONS
Supplementary European Search Report dated May 6, 2009.

* cited by examiner

*Primary Examiner* — Jason S Morrow
(74) *Attorney, Agent, or Firm* — Finnegan, Henderson, Farabow, Garrett & Dunner, LLP (57) ABSTRACT

An object is to suppress vehicle body deformation in a side collision without sacrificing a vehicle interior space.
Provided is a first reinforcing member 10 disposed in a locker 12 at a vehicle lateral direction inner side, and a second reinforcing member 20 disposed in locker 12 at a vehicle lateral direction outer side, which opposes first reinforcing member 10 in a vehicle lateral direction, and which is provided with a side surface 20A and an end surface 20E (engaging portions) that engage with first reinforcing member 10 when locker 12 deforms. When locker 12 begins to deform due to a side collision to a vehicle 18, end surface 20E of second reinforcing member 20 contacts and engages flange 10E of first reinforcing member 10, and a torsional deformation can be suppressed, and side surface 20A contacts flange 10D, and a crushing deformation of locker 12 in a vehicle lateral direction can be suppressed. Since first reinforcing member 10 and second reinforcing member 20 are provided in locker 12, vehicle interior space is not sacrificed.

9 Claims, 10 Drawing Sheets

VEHICLE BODY LOWER STRUCTURE

CROSS-REFERENCE TO RELATED APPLICATIONS

This application is a national phase application of International Application No. PCT/JP2007/059756, filed May 11, 2007, and claims the priority of Japanese Application No. 2006-148625, filed May 29, 2006, the contents of both of which are incorporated herein by reference.

TECHNICAL FIELD

The present invention relates to a vehicle body lower structure.

BACKGROUND ART

A vehicle body lower structure has been disclosed in which, in order to suppress rotational displacement of a locker in a side collision, a projecting portion is provided that projects from the locker to a vehicle inner side, and as a result of the projecting portion meeting resistance at a floor panel, rotational deformation of the locker is suppressed (see Japanese Utility Model Application Laid-Open (JP-U) No. 3-71981).

However, in the above conventional example, since the projecting portion projects from the locker to a vehicle inner side, a vehicle interior space is sacrificed.

The present disclosure considers the above facts, and an object thereof is to suppress vehicle body deformation in a side collision without sacrificing a vehicle interior space.

SUMMARY OF THE INVENTION

The present disclosure relates to a vehicle lower body structure comprising a locker provided at each of the left and right sides of a vehicle body lower portion and extending in a vehicle front-rear direction, including a locker inner panel at a vehicle inner side in a vehicle lateral direction joined with a locker outer panel at a vehicle outer side in a vehicle lateral direction; a first reinforcing member provided at a vehicle lateral direction inner side in the locker, including a flange which is parallel to a vertical wall portion of the locker inner panel, and a flange which is parallel to an upper surface of the locker inner panel; a second reinforcing member, provided at a vehicle lateral direction outer side in the locker, opposing the first reinforcing member in a vehicle lateral direction, that includes an engaging portion that engages the first reinforcing member when the locker deforms, and includes, as the engaging portion, a side surface that is adjacent to and opposes the flange parallel to the vertical wall portion, and an end surface that is adjacent to and opposes the flange parallel to the upper surface.

In the above aspect of the disclosure, when a vehicle body is to deform in a side collision, owing to the engaging of the first reinforcing member and the second reinforcing member in the locker, a torsional deformation of the locker and sectional collapse concomitant with torsional deformation can be suppressed. As a result, it is possible to suppress vehicle body deformation in a side collision without sacrificing a vehicle interior space, and to suppress the entry of vehicle structural members into a vehicle interior space.

In a further aspect of the disclosure, the vehicle body lower structure further comprises a cross member provided between the left and right lockers, at a vehicle front-rear position where the first reinforcing member and the second reinforcing member overlap in a vehicle lateral direction.

In the above aspect of the disclosure, since a cross member is provided between the left and right lockers, at a vehicle front-rear position where the first reinforcing member and the second reinforcing member overlap in a vehicle lateral direction, a side collision load inputted to a locker in a side collision is also dispersed to the cross member, thereby, it is possible to further suppress vehicle deformation.

In yet another aspect of the disclosure, the first reinforcing member and the second reinforcing member are at least disposed at a position in a vehicle front-rear direction at which a pillar is positioned.

In the above aspect of the disclosure, since the first reinforcing member and the second reinforcing member are at least disposed at a position in a vehicle front-rear direction at which a pillar is positioned, when a side collision load is inputted mainly to a pillar, a torsional deformation of the locker, and sectional collapse concomitant with torsional deformation can be suppressed. As a result, it is possible to suppress entry of the pillar into a vehicle interior space.

As described above, owing to the vehicle body lower structure according to the present disclosure, an excellent effect can be obtained, namely, it is possible to suppress deformation of a vehicle body in a side collision.

Owing to a further aspect of the vehicle body lower structure, an excellent effect can be obtained, namely, a side collision load can be dispersed also to a cross member, and deformation of a vehicle body can be further suppressed.

Owing to yet a further aspect of the vehicle body lower structure, an excellent effect can be obtained, namely, it is possible to suppress entry of a pillar into a vehicle interior space.

DETAILED DESCRIPTION

Figure 1:
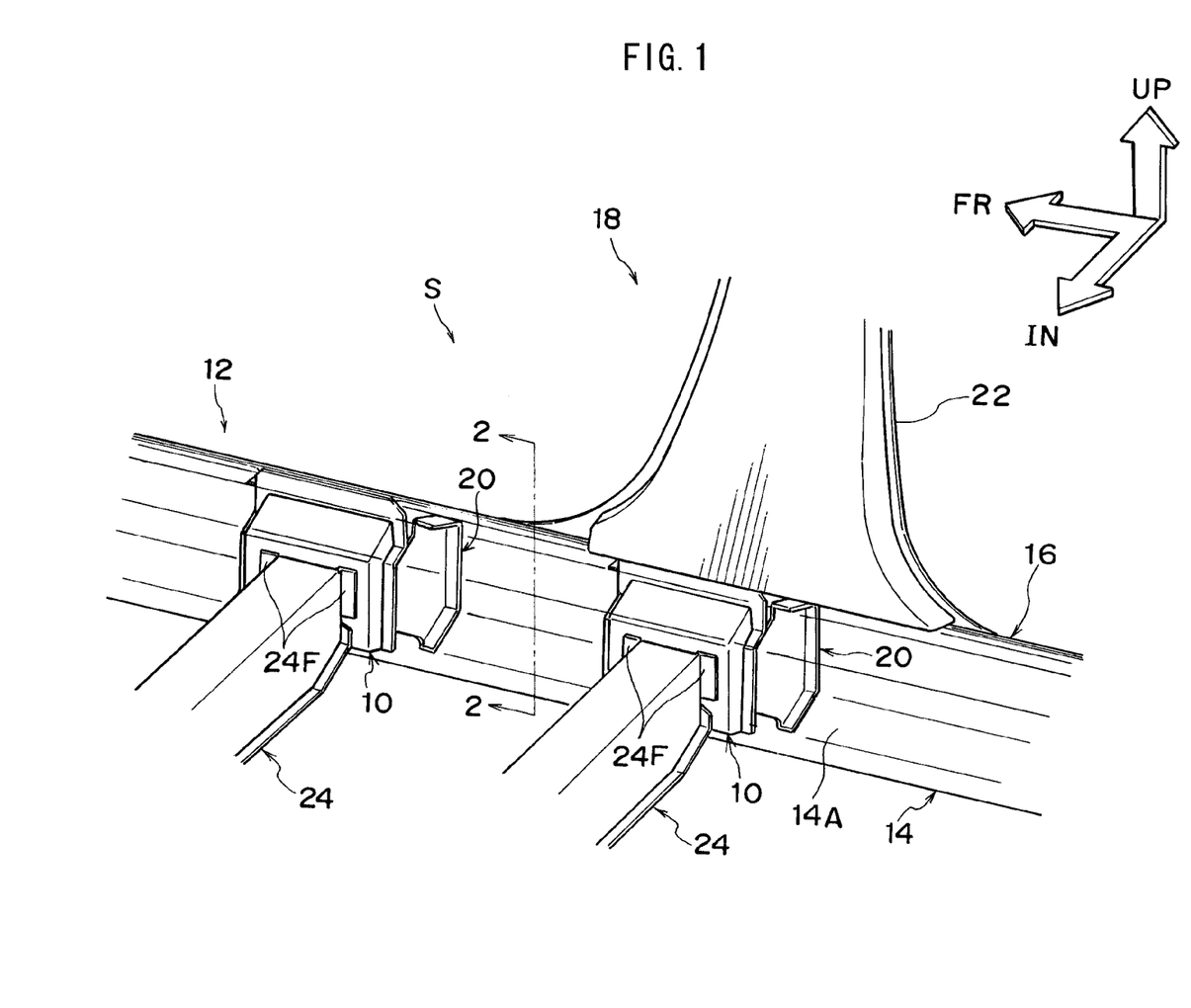
FIG. 1 is a perspective view of the vehicle body lower structure, transparently showing the first reinforcing member and the second reinforcing member in the locker.

Next, an exemplary embodiment of the present invention will be explained based on the drawings. In FIG. 1, a vehicle body lower structure S according to the embodiment comprises a locker 12, a first reinforcing member 10, and a second reinforcing member 20.

Figure 2:
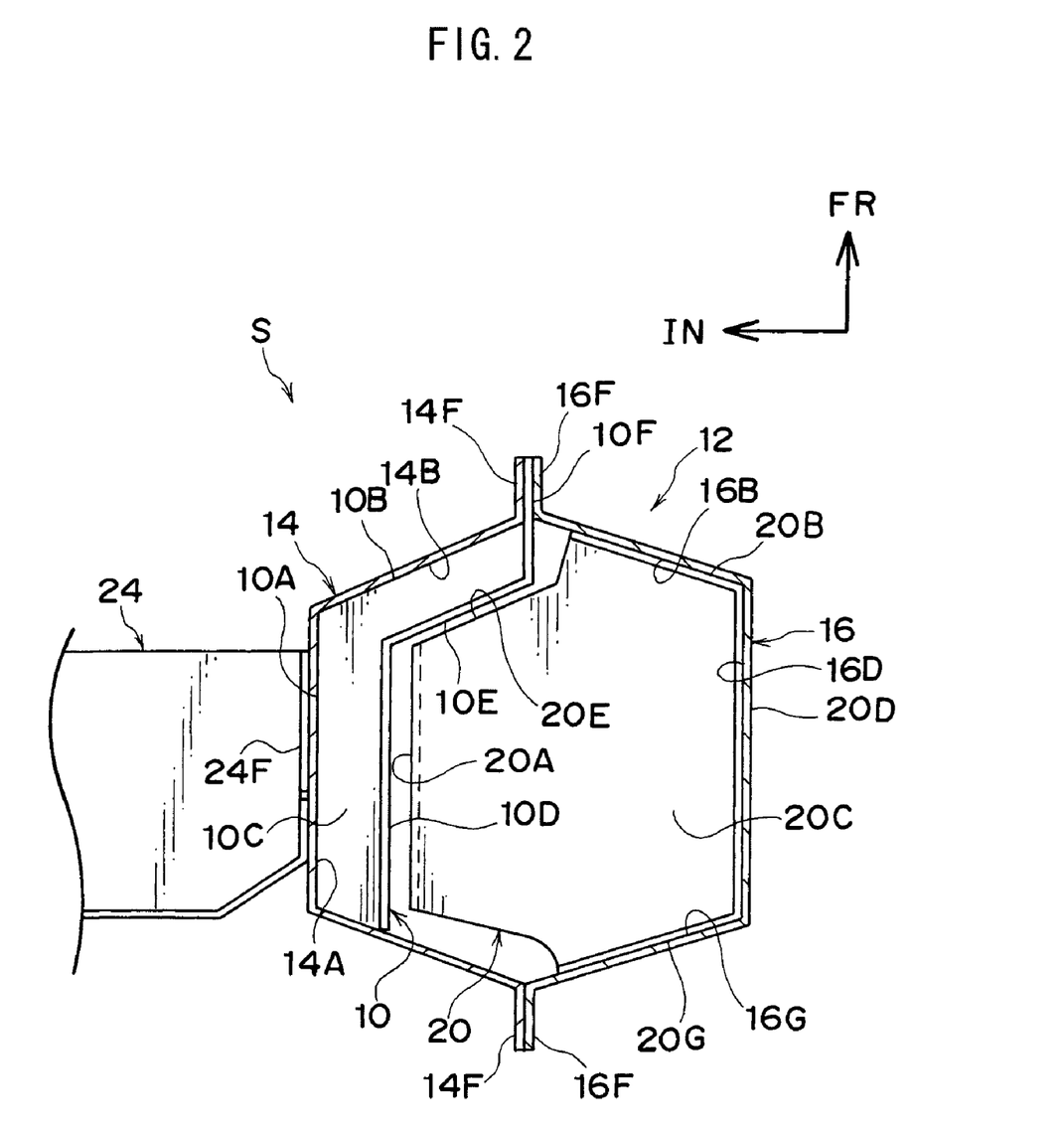
FIG. 2 is a sectional view along arrow 2-2 of FIG. 1, showing the first reinforcing member and the second reinforcing member in the locker, and a cross member.

Locker 12 is formed by joining a locker inner panel 14, and a locker outer panel 16, and a locker extends in a vehicle front-rear direction at each of the left and right sides of a lower portion of vehicle body 18. As shown in FIG. 2, locker inner panel 14 is formed in a substantial "hat" shape in cross section, projecting towards a vehicle lateral direction inner side, while locker outer panel 16 is formed in a substantial "hat" shape in cross section, projecting towards a vehicle lateral direction outer side, and they form a closed cross section, owing to spot welding or the like at upper and lower flanges 14F and 16F. As shown in FIG. 1, a lower portion of B-pillar 22, as an example of a pillar, is joined to a portion of locker 12.

As shown in FIG. 2, first reinforcing member 10 is a reinforcing member disposed at a vehicle lateral direction inner side in locker 12, and includes side surface 10A disposed along vertical wall portion 14A of locker inner panel 14, and upper surface 10B disposed along upper surface 14B of locker inner panel 14. Flange 10F is provided at a vehicle lateral direction outer side end of upper surface 10B, and extends from the end in a vehicle upper direction. Flange 10F is sandwiched by, and joined to, flange 14F of locker inner panel 14, and flange 16F of locker outer panel 16.

Figure 3:
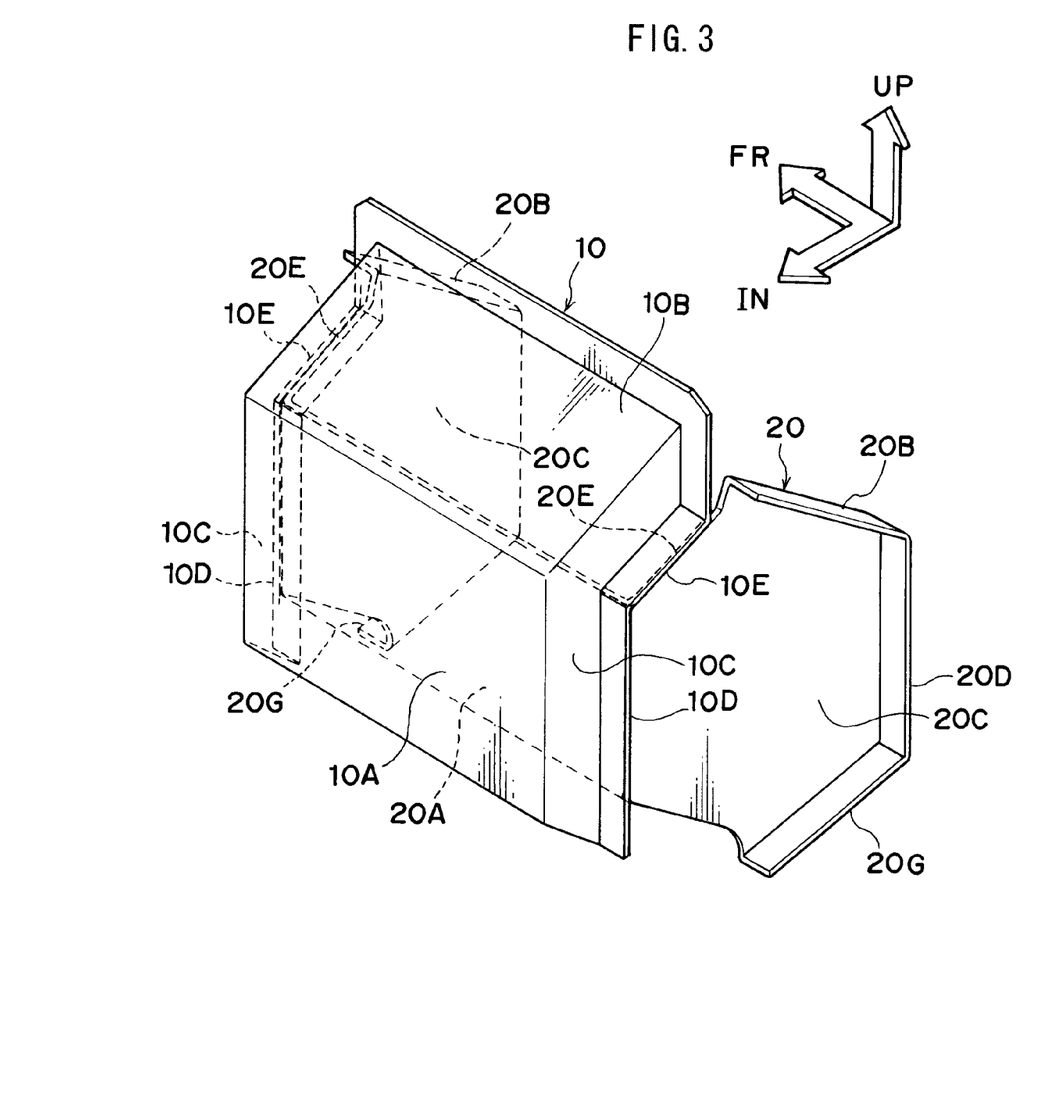
FIG. 3 is a perspective view of the first reinforcing member and the second reinforcing member.
Figure 4:
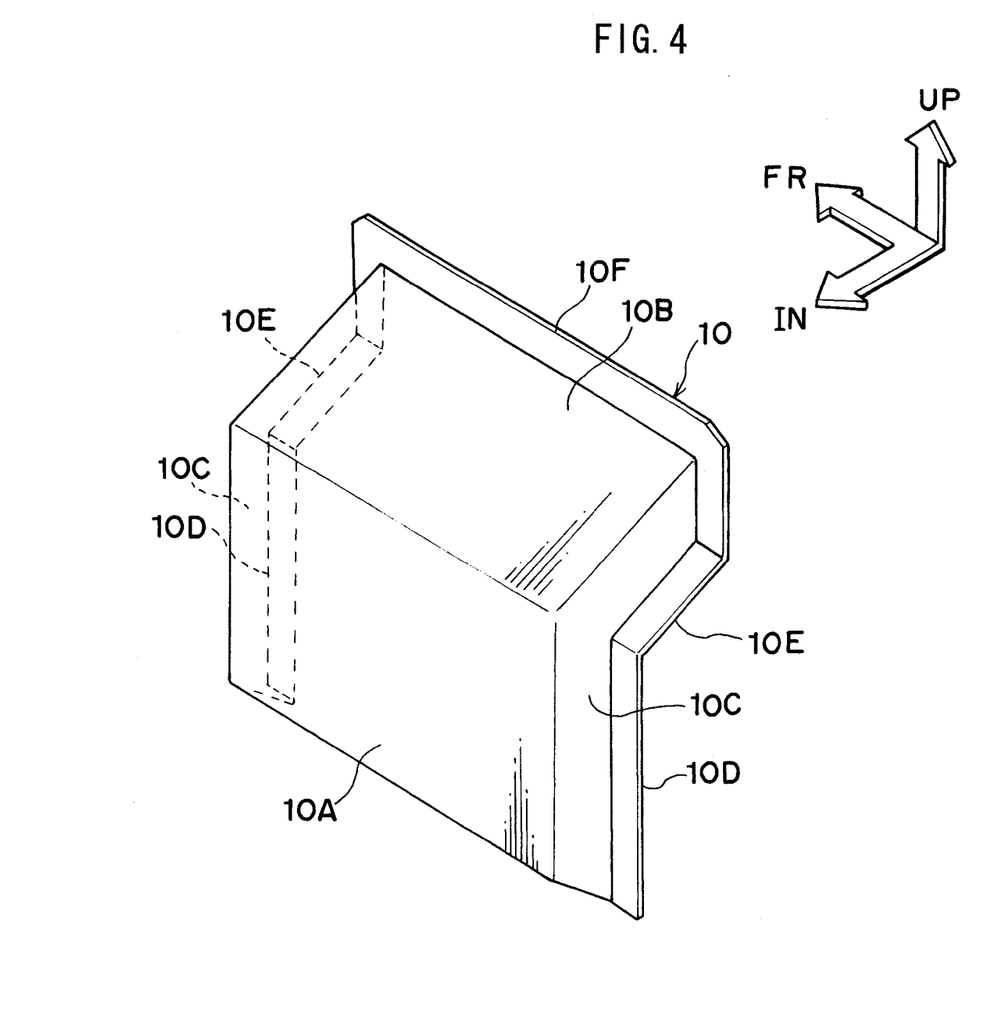
FIG. 4 is a perspective view of the first reinforcing member.

As shown in FIGS. 3 and 4, an end of side surface 10A in a vehicle front-rear direction, and an end of upper surface 10B in a vehicle front-rear direction, are in a linked state, owing to, for example, projecting portions 10C which are parallel to a vehicle lateral direction. Of the projecting portions 10C, an end of a side that opposes a second reinforcing member 20 is provided with flanges 10D and 10E, extending in a vehicle front-rear direction. As shown in FIG. 2, flange 10D is provided parallel to side surface 10A, and flange 10E is provided parallel to upper surface 10B. Since first reinforcing member 10 is formed by, for example, a deep drawing process, and considering formability, the distance from side surface 10A to flange 10D, and the distance from upper surface 10B to flange 10E is set to be the same, and in a cross section of locker 12 in a vehicle lateral direction, the region in the locker 12 taken up by first reinforcing member 10 is set to be comparatively smaller than that of second reinforcing member 20. As shown in FIG. 3, flanges 10D, 10E, and 10F may be formed continuously, for example, as an integral flange.

Figure 5:
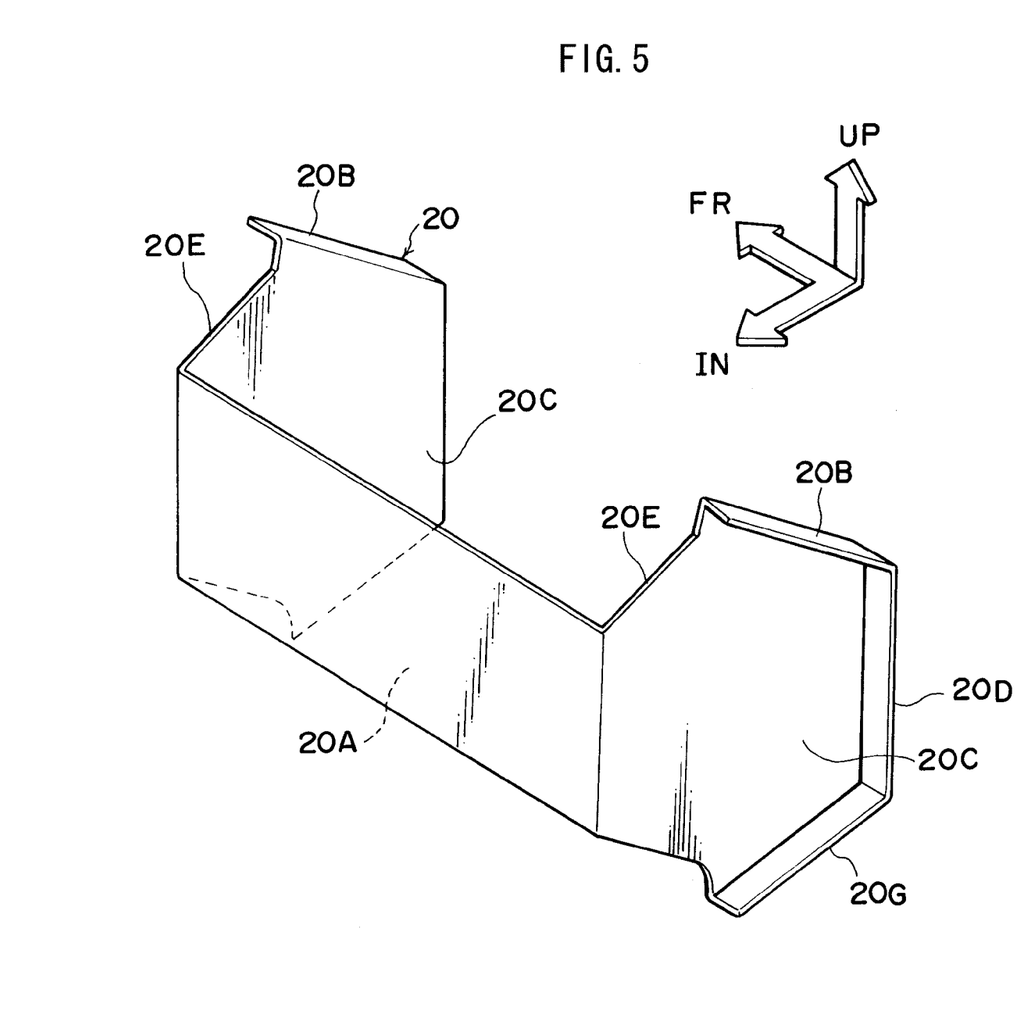
FIG. 5 is a perspective view of the second reinforcing member.

As shown in FIG. 2, second reinforcing member 20 is a reinforcing member in locker 12 at a vehicle lateral direction outer side provided opposing first reinforcing member 10 in a vehicle lateral direction, and provided thereat are side surface 20A and end surface 20E, which are examples of engaging portions that engage with first reinforcing member 10 when locker 12 deforms. Specifically, as shown in FIGS. 3 and 5, second reinforcing member 20 includes side surface 20A which extends in a vehicle front-rear direction and which opposes, in a vehicle lateral direction, front and rear flanges 10D of first reinforcing member 10 at both ends in a vehicle front-rear direction. At both ends of side surface 20A in a vehicle front-rear direction are formed projecting portions 20C that extend towards a vehicle lateral direction outer side.

As shown in FIG. 2, side surface 20A of second reinforcing member 20 is disposed substantially parallel to flange 10D of first reinforcing member 10, and is adjacent to and faces flange 10D. A width of side surface 20A in a vehicle vertical direction is, for example, set to be equal to the length of flange 10D in a vehicle vertical direction. At projecting portions 20C, end surface 20E is provided, which is disposed substantially parallel to flange 10E of first reinforcing member 10, and which is adjacent to and faces flange 10E. In other words, at second reinforcing member 20, side surface 20A and end surface 20E are engaging portions, and when locker 12 is to deform in a side collision, owing to side surface 20A of second reinforcing member 20 contacting flange 10D of first reinforcing member 10, deformation of locker 12 in a vehicle lateral direction can be suppressed, and owing to end surface 20E of second reinforcing member 20 contacting flange 10E of first reinforcing member 10, a torsional deformation of locker 12 can be suppressed.

As shown in FIGS. 3 and 5, at a locker outer panel 16 side end of projecting portion 20C, flanges 20B, 20D and 20G are formed extending in a vehicle front-rear direction, for example, continuously. As shown in FIG. 2, flange 20B is disposed along upper surface 16B of locker outer panel 16, flange 20D is disposed along vertical wall portion 16D of locker outer panel 16, and flange 20G is disposed along lower surface 16G of locker outer panel 16. Second reinforcing member 20 is joined to locker outer panel 16 by flanges 20B, 20D and 20G.

Further, as stated above, since first reinforcing member 10 is formed by, for example, a deep drawing process, in a cross section in a vehicle lateral direction of locker 12, the region taken up by first reinforcing member 10 is less than that by second reinforcing member 20 as shown in FIG. 2. In order to suppress deformation of locker 12 at the time of input of a side collision load, it is preferable that the region of locker 12 not taken up by first reinforcing member 10 is made up for with second reinforcing member 20. Therefore, second reinforcing member 20 may be formed by, for example, a bending process, such that it may readily fill the cross section of locker 12 by ensuring a large area of projecting portion 20C.

In FIG. 1, between left and right lockers 12 (the left side locker is not shown), cross member 24 is disposed at a position in a vehicle front-rear direction at which first reinforcing member 10 and second reinforcing member 20 overlap in a vehicle lateral direction. Cross member 24 is joined to vertical wall 14A of locker inner panel 14 at, for example, flange 24F. Further, first reinforcing member 10 and second reinforcing member 20 are at least disposed at a vehicle front-rear direction position of B-pillar 22, and additionally, may, for example, be disposed further towards a vehicle front direction position than B-pillar 22. The positions of first reinforcing member 10 and second reinforcing member 20 are not limited to those shown in the drawings, and they may be disposed further towards a vehicle rear direction than B-pillar 22, or the like, or at many positions within locker 12.

The present exemplary embodiment is configured as described above, and the operations thereof are explained below. In vehicle body lower structure S, upon deformation of a vehicle body upon a side collision, first reinforcing member 10 and second reinforcing member 20 provided in locker 12 engage with each other, and thereby a torsional deformation of locker 12, and a sectional collapse concomitant with torsional deformation, can be suppressed.

Figure 6:
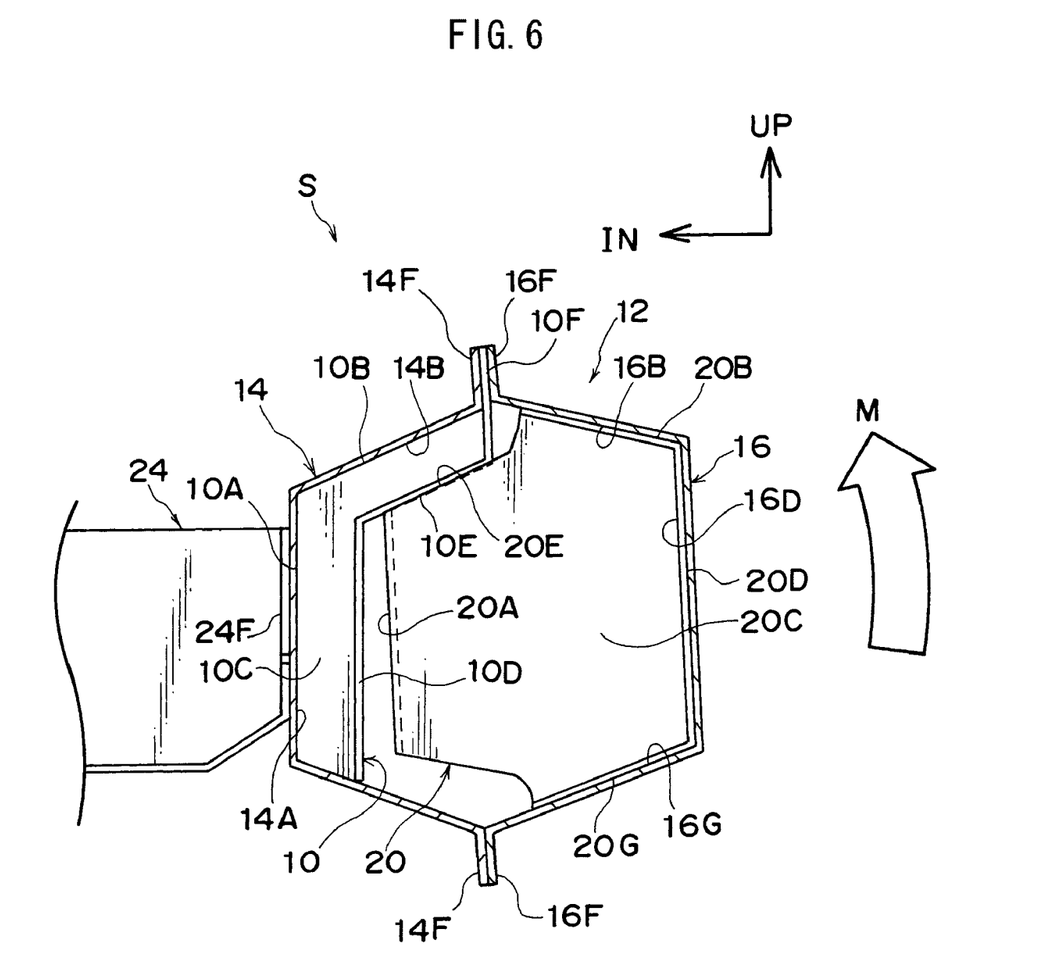
FIG. 6 is a sectional view showing a state in which a torsional deformation of the locker is suppressed, as a result of an end surface of the second reinforcing member engaging with a flange of the first reinforcing member, when a moment acts upon the locker in a side collision.

Specifically, in FIG. 1, when a side collision load owing to a side collision is inputted with respect to a position in vehicle body 18 above locker 12, such as B-pillar 22, moment M acts upon locker 12, as shown in FIG. 6. Due to moment M, locker 12 is twisted, and locker outer panel 16 begins to deform in a vehicle upper direction, but at this time, end surface 20E of second reinforcing member 20 provided at a locker outer panel 16 side contacts and engages flange 10E of first reinforcing member 10 provided at a locker inner panel 14 side, thereby suppressing further deformation of locker outer panel 16. In other words, due to the engaging, of first reinforcing member 10 and second reinforcing member 20 in locker 12, it is possible to suppress a torsional deformation of locker 12 without sacrificing a vehicle interior space.

Figure 7:
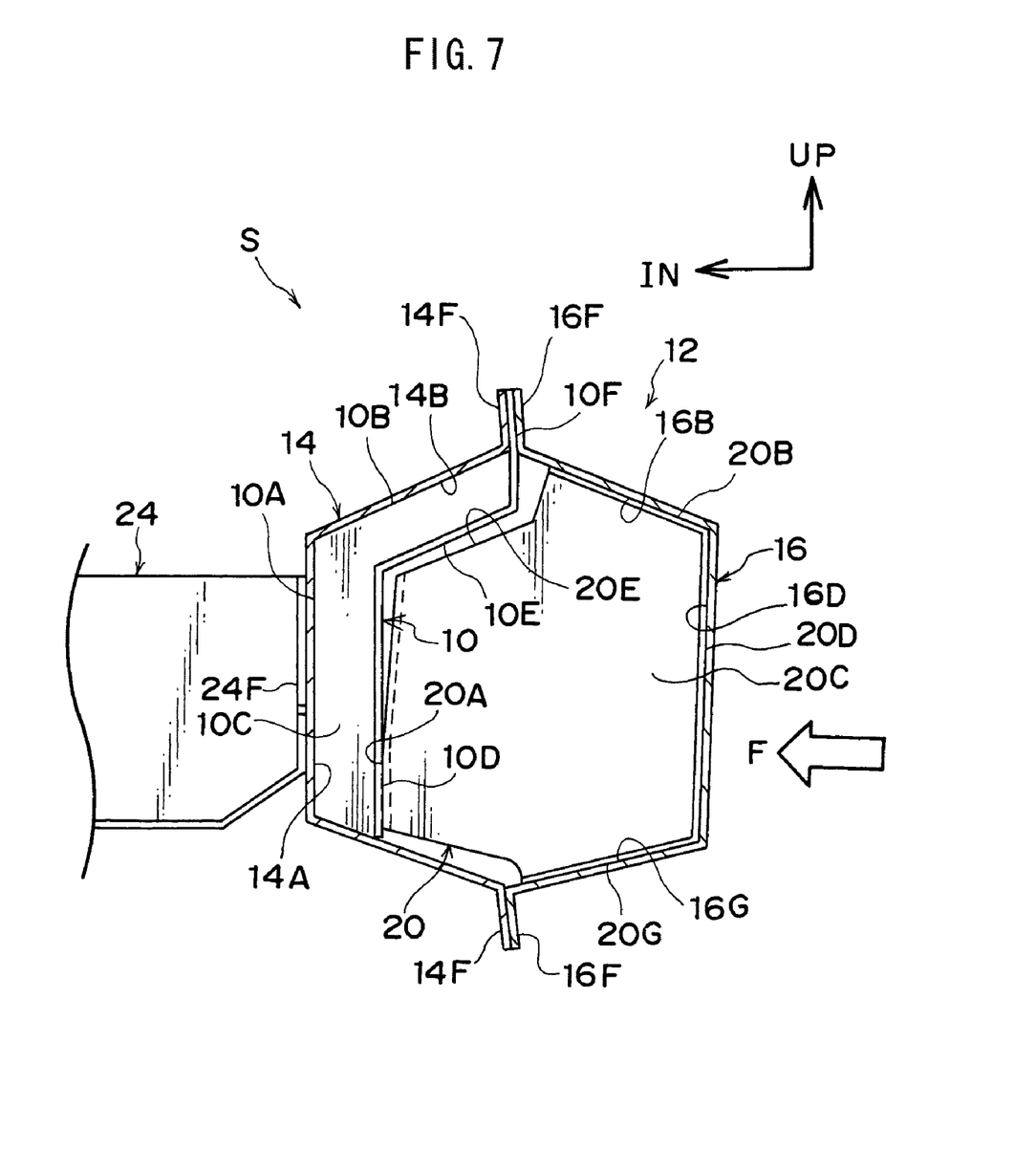
FIG. 7 is a sectional view showing a state in which a crushing deformation of the locker in a vehicle lateral direction is suppressed, as a result of a side surface of the second reinforcing member contacting a flange of the first reinforcing member, when a side collision load acts upon the locker in a side collision.

As shown in FIG. 7, when a side collision load F is inputted in a vehicle lateral direction with respect to a lower portion of locker outer panel 16, locker outer panel 16 begins to deform at a vehicle lateral direction inner side. But at this time, side surface 20A of second reinforcing member 20 contacts flange 10D of first reinforcing member 10, thereby suppressing further deformation of locker outer panel 16 toward a vehicle lateral direction inner side. As a result, it is possible to suppress a crushing deformation of locker 12 in a vehicle lateral direction.

Figure 8:
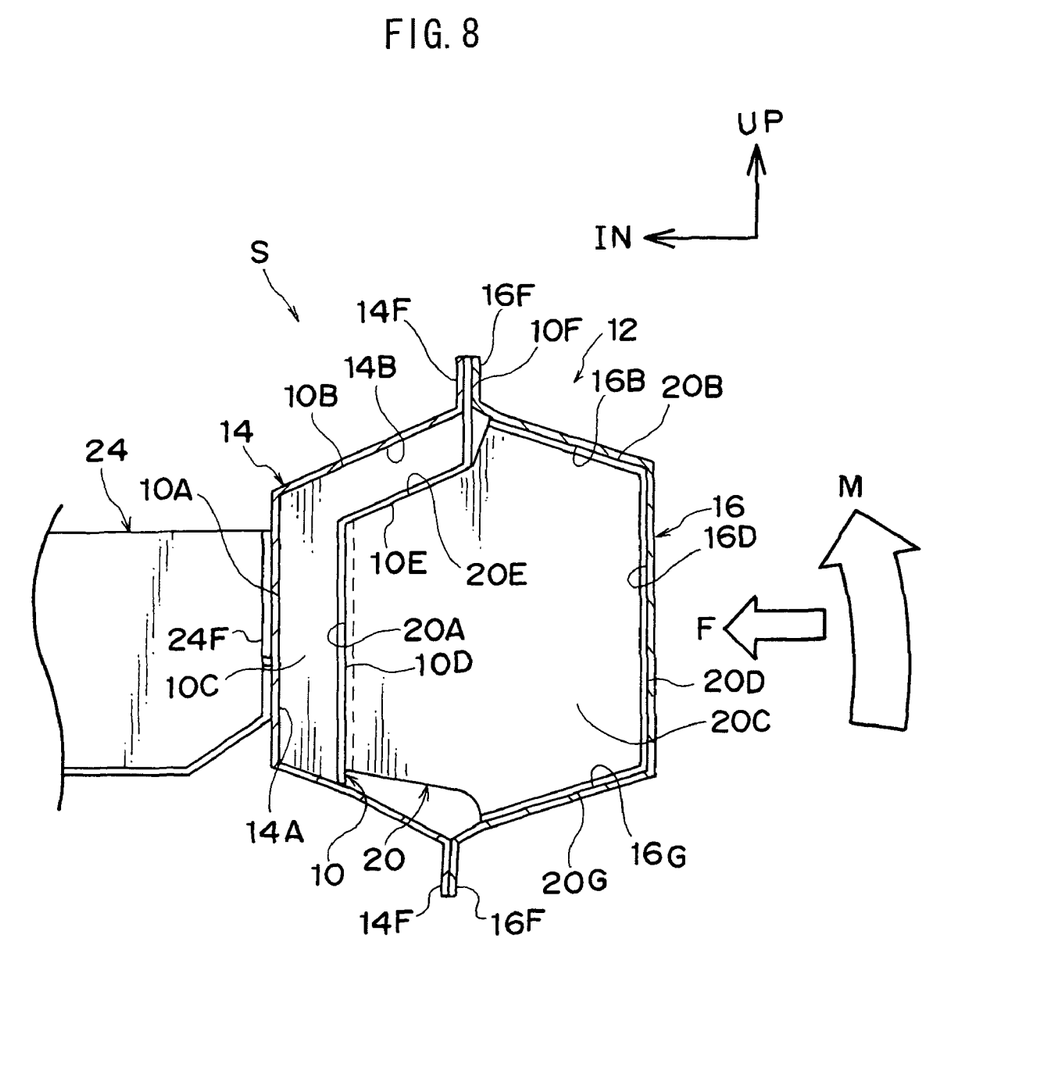
FIG. 8 is a sectional view showing a state in which, when a combination of a moment and a side collision load act upon the locker in a side collision, a torsional deformation of the locker, and sectional collapse caused by the torsional deformation, are suppressed, as a result of an end surface of the second reinforcing member engaging with a flange of the first reinforcing member, and a side surface of the second reinforcing member contacting a flange of the first reinforcing member.

Further, as shown in FIG. 8, when moment M and side collision load F are inputted in combination with respect to locker 12, end surface 20E of second reinforcing member 20 contacts and engages flange 10E of first reinforcing member 10, and additionally, side surface 20A contacts flange 10D, and thereby a torsional deformation of locker 12, and sectional collapse concomitant with torsional deformation can be suppressed.

In this way, in vehicle body lower structure S, a vehicle body deformation in a side collision can be suppressed without the sacrificing vehicle interior space, and it is possible to suppress the entry of vehicle structural members such as B-pillar 22 into the vehicle interior space. In particular, since cross member 24 is disposed at a position between the left and right lockers 12 at which first reinforcing, member 10 and second reinforcing member 20 overlap in a vehicle lateral direction, a side collision load F inputted to locker 12 in a side collision may be dispersed also to cross member 24, and thereby it is possible to further suppress vehicle body deformation. Moreover, since first reinforcing member 10 and second reinforcing member 20 are disposed at least at a position in a vehicle front rear direction at which B-pillar 22 is positioned, when a side collision load F is inputted mainly to B-pillar 22, a torsional deformation of locker 12, and sectional collapse concomitant with torsional deformation can be more effectively suppressed.

Further, in vehicle body lower structure S, productivity can be increased by using first reinforcing member 10 formed by e.g. a deep drawing process in combination with second reinforcing member 20 formed by e.g. a bending process, thereby facilitating reinforcement to suppress a torsional deformation of locker 12, and sectional collapse concomitant with torsional deformation.

Figure 9:
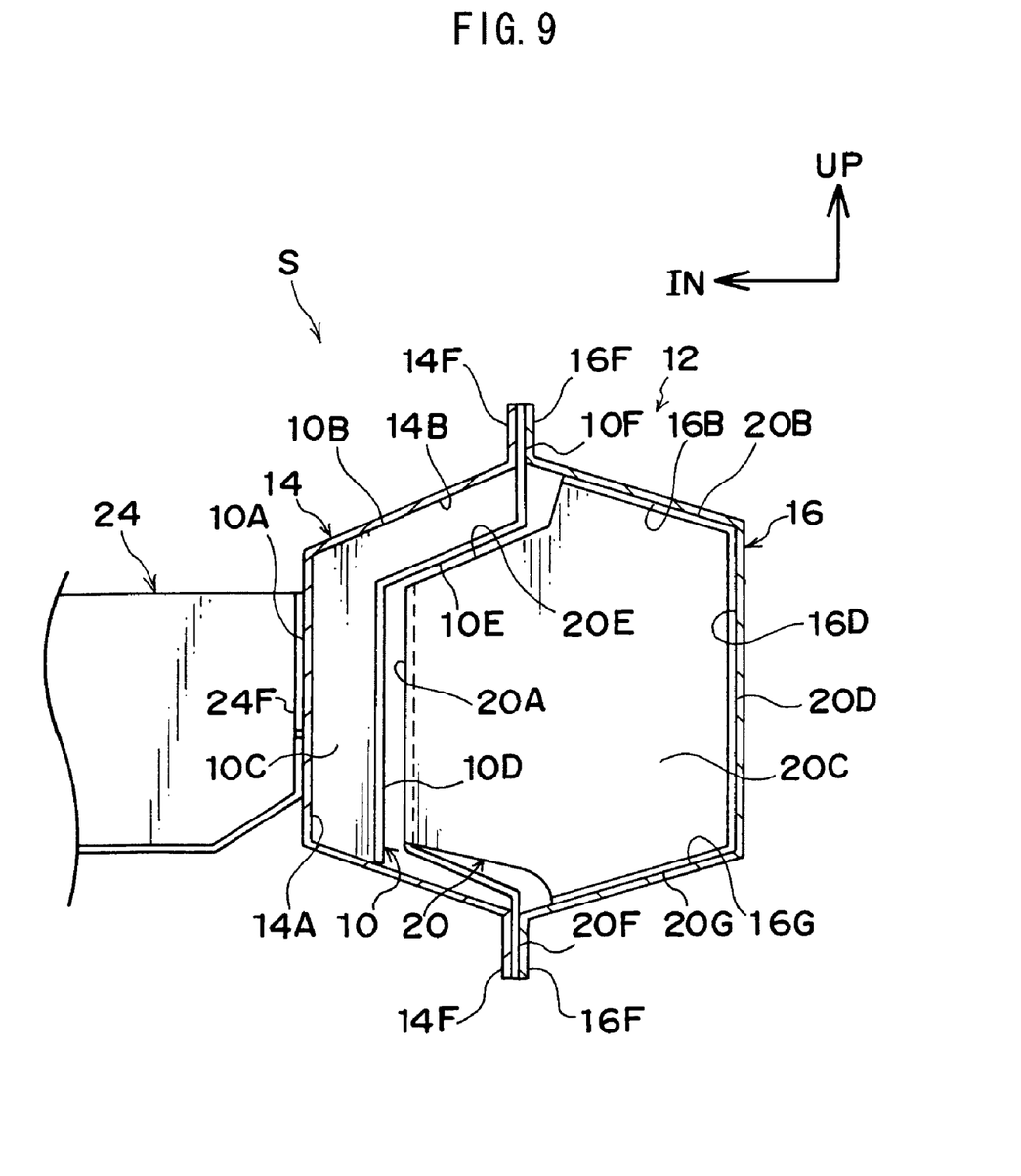
FIG. 9 is a sectional view showing a variation in which a side surface of the second reinforcing member is extended in a vehicle downward direction and a flange is provided thereat, and the flange is sandwiched between an inner panel and an outer panel of the locker and joined thereto.
Figure 10:
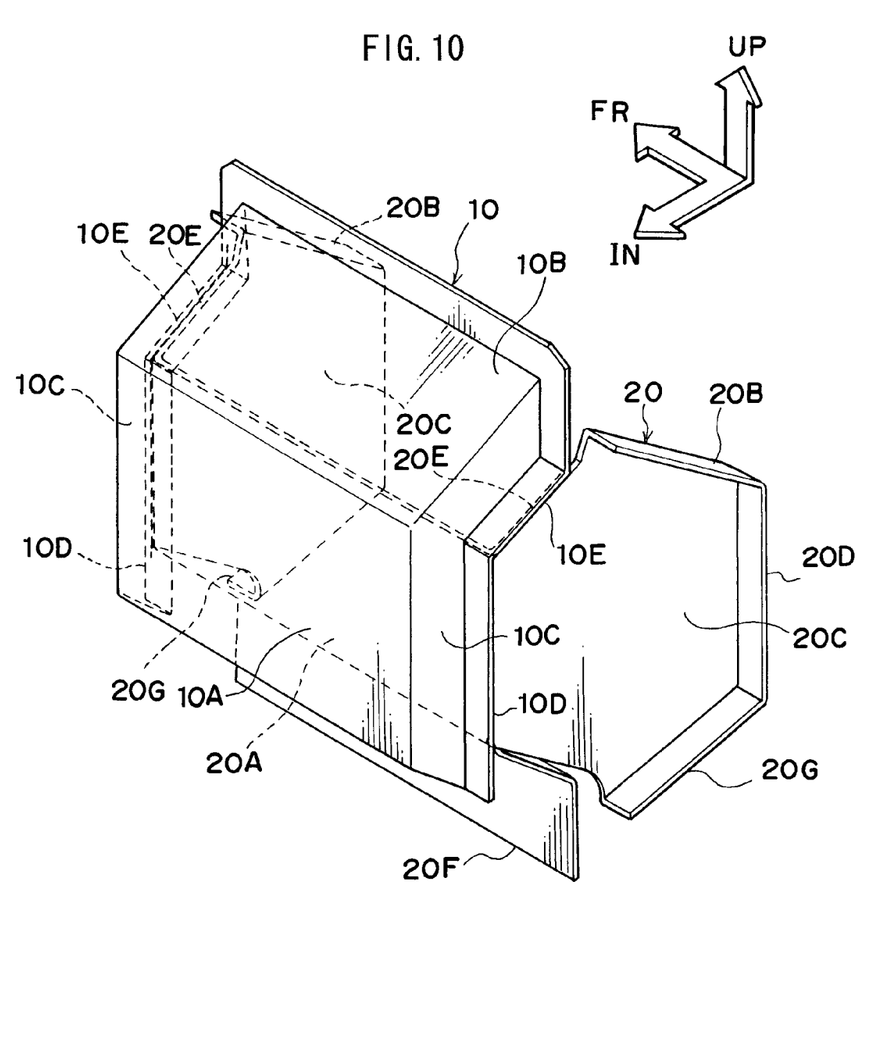
FIG. 10 is a perspective view showing the variation of the second reinforcing member shown in FIG. 9, and the first reinforcing member.

The shapes of first reinforcing member 10 and second reinforcing member 20 are not limited to the above configurations. For example, as shown in FIG. 10, a lower edge of side surface 20A of second reinforcing member 20 may be extended in a vehicle downward direction and bend to a vehicle lateral direction outer side, and a flange 20F may be provided which extends in a vehicle downward direction at the lower edge thereof. As shown in FIG. 9, flange 20F is joined and sandwiched between flanges 14F and 16F, thereby the strength of side surface 20A may be increased, and it is possible to increase the load transmission efficiency from side surface 20A to flange 10D of first reinforcing member 10.

The invention claimed is:

1. A vehicle body lower structure comprising:
    a locker provided at each of the left and right sides of the vehicle body lower portion and extending in a vehicle front-rear direction, including a locker inner panel at a vehicle inner side in a vehicle lateral direction joined with a locker outer panel at a vehicle outer side in a vehicle lateral direction;
    a first reinforcing member provided at a vehicle lateral direction inner side in the locker, including a flange which is parallel to a vertical wall portion of the locker inner panel, and a flange which is parallel to an upper surface of the locker inner panel; and
    a second reinforcing member, provided at a vehicle lateral direction outer side in the locker, opposing the first reinforcing member in a vehicle lateral direction, that includes an engaging portion that engages the first reinforcing member when the locker deforms, and includes, as the engaging portion, a side surface that is directly adjacent to and opposes the flange parallel to the vertical wall portion, and an end surface that is adjacent to and opposes the flange parallel to the upper surface.

2. The vehicle body lower structure of claim 1, provided with a cross member provided between the left and right lockers, at a vehicle front-rear position where the first reinforcing member and the second reinforcing member overlap in a vehicle lateral direction.

3. The vehicle body lower structure of claim 1, wherein the first reinforcing member and the second reinforcing member are at least disposed at a position in a vehicle front-rear direction at which a pillar is positioned.

4. The vehicle body lower structure of claim 1, wherein a flange extending in a vehicle downward direction is provided at a lower edge of the side surface of the second reinforcing member, and the flange is sandwiched and joined between the locker inner panel and the locker outer panel.

5. The vehicle body lower structure of claim 1, wherein the first reinforcing member is formed by a deep drawing process, and the second reinforcing member is formed by a bending process.

6. The vehicle lower body structure of claim 1, wherein the side surface engages the flange parallel to the vertical wall portion, and the end surface engages the flange parallel to the upper surface.

7. The vehicle lower body structure of claim 1, wherein the second reinforcing member further includes:
    a protecting portion defined at the side surface of the second reinforcing member, and extending from the side surface to the locker outer panel in the vehicle front-rear direction;
    a flange parallel to a vertical wall portion of the locker outer panel;
    a flange parallel to an upper surface of the locker outer panel; and
    a flange parallel to a lower surface of the locker outer panel.

8. The vehicle lower body structure of claim 1, wherein a width, in a vehicle vertical direction, of the side surface is substantially equal to a length, in the vehicle vertical direction, of the flange parallel to the vertical wall portion.

9. The vehicle lower body structure of claim 1 further comprising a flange extending in a vehicle upward direction at an upper edge of an upper surface of the first reinforcing member, and being defined by an integral, unitary piece of material that also defines both the flange parallel to the vertical wall portion and the flange parallel to the upper surface.

* * * * *